US012798782B2

(12) United States Patent
Costa et al.

(10) Patent No.: US 12,798,782 B2
(45) Date of Patent: Nov. 17, 2026

(54) AIRCRAFT PROVIDED WITH A HEATING SYSTEM FOR A TURBOSHAFT ENGINE PLENUM

(71) Applicant: AIRBUS HELICOPTERS, Marignane Cedex (FR)

(72) Inventors: Stéphane Costa, Istres (FR); Alexandre Di-Marco, Marignane Cedex (FR); Christophe Albertini, Septemes les Vallons (FR)

(73) Assignee: AIRBUS HELICOPTERS (FR)

( * ) Notice: Subject to any disclaimer, the term of this patent is extended or adjusted under 35 U.S.C. 154(b) by 0 days.

(21) Appl. No.: 18/914,677

(22) Filed: Oct. 14, 2024

(65) Prior Publication Data

US 2025/0368344 A1 Dec. 4, 2025

(30) Foreign Application Priority Data

Dec. 14, 2023 (FR) ...................................... 2314190

(51) Int. Cl.
*B64D 3/02* (2006.01)
*B64D 33/02* (2006.01)

(52) U.S. Cl.
CPC ...... *B64D 33/02* (2013.01); *B64D 2033/0233* (2013.01); *B64D 2033/0266* (2013.01)

(58) Field of Classification Search
CPC ............ B64D 33/02; B64D 2033/0233; B64D 2033/0266
See application file for complete search history.

(56) References Cited

U.S. PATENT DOCUMENTS 4,039,804 A * 8/1977 Reed .......................... F02C 9/32 700/287
5,011,098 A * 4/1991 McLaren ............... B64D 27/14 244/134 B
2009/0139200 A1 6/2009 Colaprisco
2012/0128467 A1* 5/2012 Ruthemeyer ........... F02C 7/143 165/181
(Continued)

FOREIGN PATENT DOCUMENTS

EP 2129579 B1 2/2011
EP 2626533 A1 8/2013
EP 3115298 A1 * 1/2017 ............. F02C 7/047
(Continued)

OTHER PUBLICATIONS

French Search Report for French Application No. FR2314190, Completed by the French Patent Office, Dated Jul. 3, 2024, 9 pages.

*Primary Examiner* — Valentina Xavier
(74) *Attorney, Agent, or Firm* — Brooks Kushman P.C.

(57) ABSTRACT

An aircraft provided with a turboshaft engine comprising a gas generator, the gas generator comprising a compression assembly supplying air to a combustion chamber and a turbine assembly supplied with gas by the combustion chamber, the aircraft having a plenum supplying air to the compression assembly. The aircraft comprises a heating system, the heating system comprising a heat exchanger arranged in the plenum, the heating system comprising a fluid supply connection and a fluid discharge connection connected to the heat exchanger, the fluid supply connection conveying hot air from the turboshaft engine into the heat exchanger.

20 Claims, 3 Drawing Sheets

(56) References Cited

U.S. PATENT DOCUMENTS

| | | | | |
|---|---|---|---|---|
| 2017/0314465 | A1* | 11/2017 | Beutin | F02C 7/185 |
| 2018/0003076 | A1* | 1/2018 | Miller | F28D 1/0308 |

FOREIGN PATENT DOCUMENTS

| | | | | | |
|---|---|---|---|---|---|
| FR | 2924471 | B1 | | 11/2013 | |
| FR | 3007798 | A1 | | 1/2015 | |
| FR | 3057301 | A1 | | 4/2018 | |
| GB | 2204361 | A | * | 11/1988 | F02C 7/047 |
| WO | WO-9513467 | A1 | * | 5/1995 | F02K 1/822 |

* cited by examiner

AIRCRAFT PROVIDED WITH A HEATING SYSTEM FOR A TURBOSHAFT ENGINE PLENUM

CROSS REFERENCE TO RELATED APPLICATION

This application claims priority to FR 23 14190 filed on Dec. 14, 2023, the disclosure of which is incorporated in its entirety by reference herein.

TECHNICAL FIELD

The present disclosure relates to an aircraft provided with a heating system for a turboshaft engine plenum. Such an aircraft may be a rotorcraft. The technical field of the disclosure therefore relates to the field of engine air supply systems.

BACKGROUND

In particular, an engine may be a turboshaft engine comprising a gas generator and at least one turbine. The gas generator is provided with a compression assembly supplying compressed air to a combustion chamber. The gas generator is also provided with a turbine assembly set in motion by the hot gases exiting the combustion chamber. The turbine assembly is constrained to rotate with the compression assembly.

The aircraft comprises an air supply system for supplying the compression assembly of the gas generator with the air from the outside. Depending on the architecture of the turboshaft engine and the aircraft, the air supply system may comprise a radial air intake surface. An air supply system with a radial air intake is also static, with the air entering the radial air intake surface mainly being drawn in by the turboshaft engine. Conversely, a dynamic air supply system comprises an air vent that takes air in under the effect of the forward movement of the aircraft.

An air supply system with a radial air intake comprises one or more intake sections. Each intake section is provided with a radial air intake surface, that is generally rectangular, arranged radially in relation to the turboshaft engine. This intake section is connected to the gas generator of the turboshaft engine by an annular duct. A person skilled in the art may conventionally refer to such a system as a “plenum”.

Therefore, a plenum comprises an annular duct arranged around a central axis along which a turboshaft engine extends. The annular duct thus delimits an annular cavity in fluidic communication with one or more intake sections and the turboshaft engine.

Therefore, the air situated outside the aircraft enters the plenum through a radial air intake section, and is then conveyed radially towards the turboshaft engine by the annular duct.

A grating may possibly be positioned at the interface between the plenum and the turboshaft engine in order to prevent the turboshaft engine from ingesting unwanted particles.

Document FR 3007798 A describes a plenum.

When the aircraft is flying in icing conditions, snow or ice may accumulate at the bottom of the plenum. The bottom of the plenum may be constituted by the part of the plenum located at the lowest point at predetermined authorized attitude angles of the aircraft. The plenum may comprise drains for discharging the water contained in the plenum. The rolling motion of the aircraft may also allow snow or ice to be discharged out of the plenum. Furthermore, the engine is designed to function normally after ingesting a certain amount of snow or ice. It should be noted that the phenomenon that occurs is different in a dynamic air intake, in particular the problem of snow or ice accumulating on a bottom wall of the plenum, because air can enter a dynamic air intake at high speed.

Nevertheless, the ingestion of an excessive amount of snow or ice is likely to damage vanes of the compression assembly of the turboshaft engine, or even extinguish the combustion chamber in extreme cases. The plenum is therefore defined such that the turboshaft engine ingests a quantity of snow or ice that is below a certain threshold.

Some devices used to combat the formation of ice and snow comprise electric heating strips. Such systems may be relatively complicated, and require considerable electrical energy.

Patent FR2924471 B1 discloses a filtering system potentially provided with a means for heating a grating.

Patent EP2129579 B1 describes a dynamic air intake vent comprising a toroidal air flow channel for heating the leading edge of this intake vent. The aim of this patent is to prevent ice or snow from forming and it is therefore far removed from the problem of limiting the ice or snow on the bottom of a plenum. In other words, patent EP2129579 B1 relates to an anti-icing system, not to a de-icing system. Documents FR3057301, EP2626533 and US2009139200 are also known.

SUMMARY

An object of the present disclosure is thus to propose an aircraft provided with an innovative system designed to minimize the amount of snow and/or ice that is likely to be ingested by a turboshaft engine.

The present disclosure relates to an aircraft provided with a turboshaft engine comprising a gas generator, the gas generator comprising a compression assembly supplying compressed air to a combustion chamber, the gas generator comprising a turbine assembly supplied with gas by the combustion chamber, the aircraft having an air supply system with a radial intake provided with a plenum supplying air to the compression assembly, the plenum comprising a duct, for example a substantially annular duct, provided with an outer opening leading to an outside environment situated outside the aircraft, and an inner opening in fluidic communication with the turboshaft engine. The outer opening may be a static radial opening, i.e., an opening that extends around a central axis along which the turboshaft engine is arranged. The central axis may be an axis of symmetry of at least part of the plenum and/or the turboshaft engine.

This aircraft comprises a heating system, the heating system comprising a heat exchanger arranged in a volume delimited by the plenum, the heating system comprising a fluid supply connection and a fluid discharge connection connected to the heat exchanger, the fluid supply connection conveying hot air from the turboshaft engine into the heat exchanger.

Flying in icing conditions may be problematic. In such conditions, some aircraft may have a limited flight envelope due to the risks associated with ice or snow being ingested into a turboshaft engine.

In order to solve this problem, the heat exchanger of the disclosure is supplied with hot air by the turboshaft engine in such conditions. This heat exchanger is therefore heated by hot air and allows the skin temperature to rise above zero degrees Celsius, or even 10 degrees Celsius. The heat exchanger can therefore heat the plenum by convection and radiation, and can thus limit the amount of ice or snow in the plenum, in particular making it melt. This solution runs counter to preconceptions, because the purpose of the plenum is to capture cool air from outside. Arranging a heating system in the plenum appears to be at odds with the ingestion of cool air. However, using the heating system in icing conditions may have an impact that is acceptable in terms of the operation of the engine. The heating system of the disclosure is therefore generally beneficial because it has a limited impact on the temperature of the air ingested by the turboshaft engine while reducing the quantity of ice or snow likely to be ingested into the turboshaft engine.

Furthermore, the heating system is simple and may be arranged on an existing aircraft.

The aircraft may also include one or more of the following features.

According to one possibility, the turboshaft engine comprising a gas stream extending from the plenum and passing successively through the compression assembly, then the combustion chamber and the turbine assembly, the fluid supply connection may be in fluidic connection with the gas stream downstream of a compression stage of the compression assembly.

The fluid supply connection has a connection referred to be a person skilled in the art as a “P3 connection” in order to be supplied with hot air from the gas stream. The air that is drawn in is air at a high temperature, for example in the region of 200 to 400 degrees Celsius, and pressurized, for example in the region of 6 to 9 bar, obtained by compressing the air ingested by the turboshaft engine.

Therefore, the air that is taken in has a temperature higher than the ingested air and allows the heat exchanger, and therefore the plenum, to be heated. The amount of air taken in to supply the heat exchanger may be relatively low, for example in the region of 5 to 10 grams per second, and does not have a significant impact on the operation of the turboshaft engine.

The heating system may therefore be relatively simple, unlike an electric heater that needs considerable electrical energy.

The heating system according to the disclosure is particularly advantageous when there is a plenum forming a passive air intake, i.e., having no means for controlling the elements entering the plenum, such as a particulate filter, for example.

According to one possibility compatible with the preceding possibilities, the fluid supply connection and the fluid discharge connection may pass through the same wall of the plenum to reach an engine compartment of the aircraft, the turboshaft engine being at least partially housed in this engine compartment.

The arrangement of the heating system then has less of an impact on the plenum.

According to one possibility compatible with the preceding possibilities, the fluid discharge connection may lead into the engine compartment, the turboshaft engine being at least partially housed in this engine compartment.

The hot air passing through the heat exchanger is then discharged into the engine compartment.

Such discharge has no effect on the aircraft insofar as the turboshaft engine casing reaches temperatures higher than the temperature reached by this air at the heat exchanger outlet. By way of illustration, when using the abovementioned P3 connection, the hot air exiting the fluid discharge connection may be in the region of 100 to 120 degrees Celsius, whereas some regions of the turboshaft engine may reach temperatures higher than 150 degrees Celsius. Moreover, the engine compartment may comprise a fire detector that generates an alert signal if the temperature in the engine compartment rises above 200 degrees Celsius, and therefore if the temperature is higher than the temperature of the hot air exiting the heat exchanger.

The engine compartment may lead in a conventional manner to an outlet nozzle, that draws in the air present in this engine compartment.

According to one possibility compatible with the preceding possibilities, the heat exchanger may comprise two walls separated by studs, said hot air flowing between the two walls.

The heat exchanger may be relatively flat, and may have a limited impact on the operation of the air intake. The two walls may be parallel to each other. For example, the walls each have a substantially parallelepiped shape when viewed from above, and the heat exchanger may be in the form of a block.

According to one possibility compatible with the preceding possibility, the heat exchanger may comprise a central deflector providing a U-shaped path between the two walls, this path leading from the fluid supply connection to the fluid discharge connection in a direction of flow of the hot air.

This feature makes it possible to arrange the fluid supply connection and the fluid discharge connection on the same side of the heat exchanger, in relation to a direction wherein the heat exchanger extends. This may therefore make it easier to arrange the heating system in an aircraft.

According to one possibility compatible with the preceding possibilities, the heating system may comprise one or more fastenings securing the heat exchanger to the plenum, the heat exchanger not being in contact at least with a bottom of the plenum.

For example, four fastenings are connected to four corner regions of the heat exchanger, possibly situated under the heat exchanger or in the vicinity of the heat exchanger.

The impact on the plenum is thus limited. Furthermore, this arrangement allows an air stream to be generated surrounding the heat exchanger. This arrangement may help promote heating by convection and/or allow drains to be arranged under the heat exchanger in order to discharge water.

According to one possibility y compatible with the preceding possibilities, the fluid supply connection may comprise a solenoid valve arranged between two pipes, the solenoid valve being configured to allow or to prevent said hot air to be conveyed into the heat exchanger.

A human-machine interface may be connected to the solenoid valve via a wired or wireless link in order to allow a pilot to control this solenoid valve. A pilot may therefore open the solenoid valve only when the aircraft is moving in icing conditions.

According to one possibility compatible with the preceding possibilities, the fluid supply connection may comprise a narrowing forming a flow limiter.

The narrowing may allow the movement of hot air in the heat exchanger to be kept at a subsonic speed, while having an optimal fluid flow rate to achieve optimized heat exchange. The heating system may therefore be relatively simple and easily certified by the aviation authorities.

According to one possibility compatible with the preceding possibilities, the heating system may comprise a pressure sensor connected to an alerter.

The pressure sensor is a sensor that can be used to generate a signal when a pressure in the fluid supply connection is above a certain threshold. The purpose of the pressure sensor is simply to indicate to a crew whether or not the heating system is functioning.

If the heating system is not functioning, the pressure in the fluid supply connection is below the threshold. A pilot is warned of this in order to exit the icing conditions as quickly as possible.

For example, the pressure sensor comprises a pressure switch that issues a signal when the pressure in the fluid supply connection is greater than or equal to the threshold. The term "signal" may refer to an analog, digital, electrical or optical signal. The alerter may be configured to generate an alert as long as the signal is not received.

According to one possibility compatible with the preceding possibilities, the plenum may comprise at least one drain.

Such a drain may comprise a simple hole or a more complex device comprising a valve and/or a grating, for example.

At least one drain may be situated on a wall of the plenum opposite the heat exchanger.

For example, the plenum may comprise four drains positioned in four corners for draining the plenum, irrespective of the roll and pitch angles of the aircraft.

According to one possibility compatible with the preceding possibilities, the air supply system may be a passive system ingesting air from said outside environment under the effect of suction from the turboshaft engine.

This system differs from a dynamic system, that is subject to other phenomena.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Figure 1:
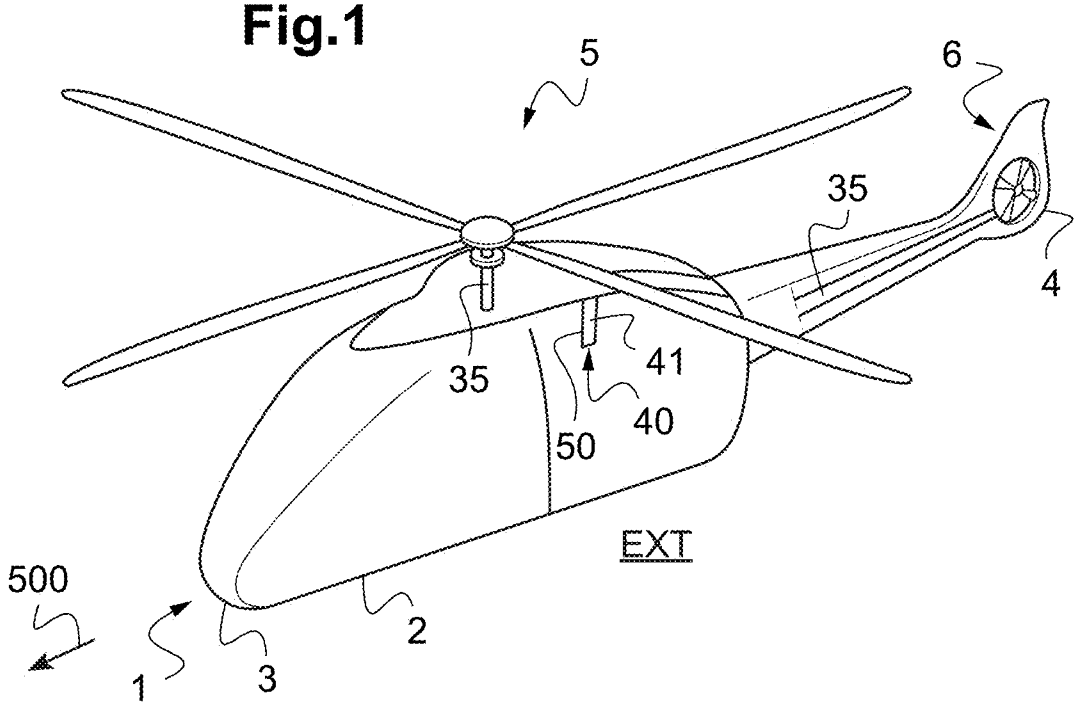
FIG. 1 is an outside view of an aircraft according to the disclosure.

FIG. 1 shows an aircraft 1 according to the disclosure. This aircraft 1 comprises an airframe 2 extending in the direction of forward travel 500 of the aircraft from a rear end 4 towards a nose 3.

The aircraft 1 comprises a power plant provided with an air supply system with a radial intake provided with a plenum 40 having a radial outer opening 41 for supplying a turboshaft engine. The term "radial" refers to a direction orthogonal to a central axis along which the turboshaft engine extends. For example, the turboshaft engine sets a power transmission system 35 in motion, this power transmission system 35 being able to set in motion at least one rotor 5,6 contributing to the propulsion and/or the lift of this aircraft 1 and/or helping to control this aircraft 1. For example, the aircraft 1 is a helicopter provided with a main rotor 5 contributing to its lift and propulsion, and a tail rotor 6 helping to control the yaw motion of the aircraft 1.

Figure 2:
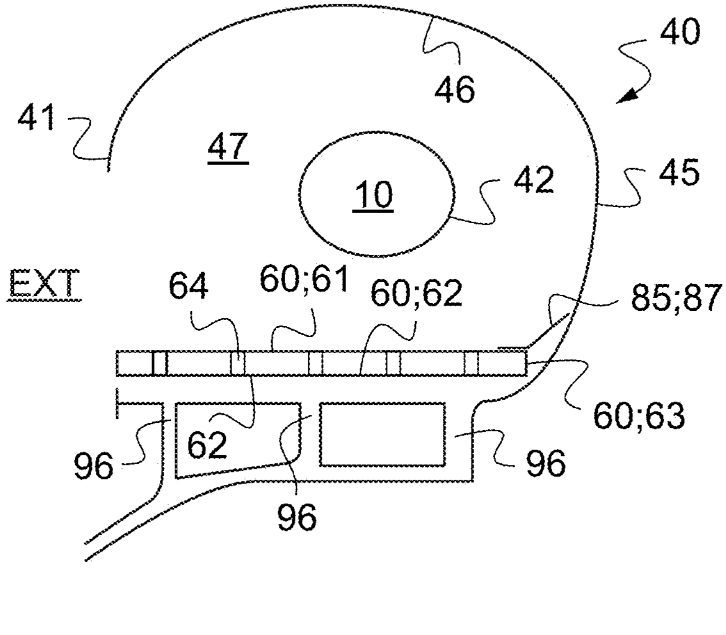
FIG. 2 is a cross-sectional diagram of a plenum of an aircraft according to the disclosure.

In reference to FIG. 2, the plenum 40 comprises a duct 46 provided with an outer opening 41 leading to an environment EXT outside the aircraft, and an inner opening 42 leading to an air intake of a turboshaft engine 10. The duct 46 may be described as annular insofar as it extends radially from the outer opening 41 towards the inner opening 42. In order to delimit the duct 46, the plenum 40 may comprise two partitions 43, 44, not shown in FIG. 2, that are connected by an edge section 45, that is, for example, substantially arc-shaped.

Figure 3:
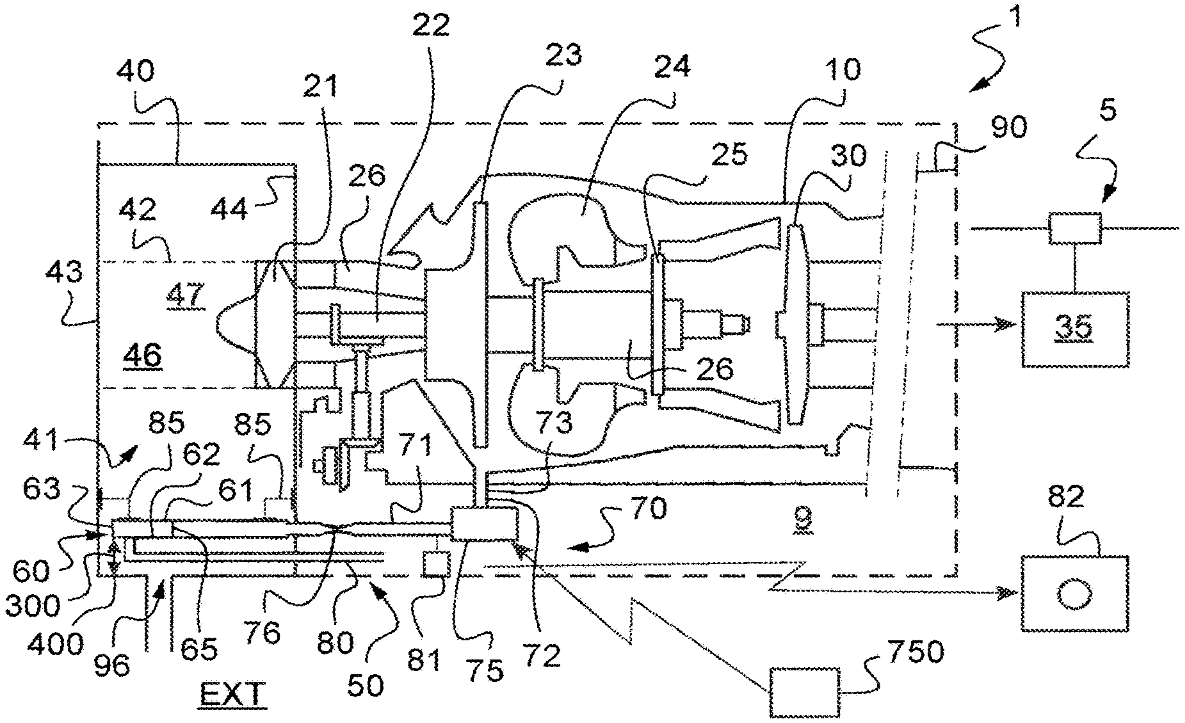
FIG. 3 is a diagram showing the heating system of the disclosure.

In reference to FIG. 3, the turboshaft engine 10 is arranged at least partially in an engine compartment 9. This engine compartment 9 may lead to an outlet nozzle 90, the air present in the engine compartment 9 being sucked into the outlet nozzle 90 during operation.

The turboshaft engine 10 comprises a gas generator 15. The gas generator 15 is provided with a compression assembly 20 supplied with cool air by the plenum 40. For example, the compression assembly 20 comprises one or more compression stages 21, 23. The example provided shows a compression assembly 20 provided with a first compression stage 21 constrained to rotate with a second compression stage 23, via a shaft 22.

Downstream of the compression assembly 20, in the direction of flow of the gases in the turboshaft engine 10, the gas generator 15 comprises a combustion chamber 24, then a turbine assembly 25. The turbine assembly 25 is set in motion by the gases exiting the combustion chamber 24, and is constrained to rotate with the compression assembly 20. The turbine assembly 25 may comprise at least one turbine. Finally, the turboshaft engine 10 comprises at least one power turbine 30, for example connected to the power transmission system 35 disclosed above.

The turboshaft engine 10 comprises a gas stream 26 that starts from the plenum 40, passes through the vanes of the compression stages 22, 23, and then through the combustion chamber 24, the vanes of the turbine or turbines of the turbine assembly 25 and lastly the vanes of the working turbine or turbines 30.

The aircraft 1 comprises a heating system 50 for minimizing the accumulation of ice and/or snow in the plenum 40. The heating system 50 may be a de-icing system for limiting the formation of ice and snow to a level that is acceptable for the turboshaft engine 10.

This heating system 50 comprises a heat exchanger 60 arranged in the volume 47 delimited by the plenum 40, i.e., inside the plenum 40, not inside a wall of the plenum 40.

For example, the heating system 50 comprises one or more fastenings 85 each securing the heat exchanger 60 to the plenum 40. For example, the heat exchanger is fastened by two fastenings 88, 89 to two respective partitions 43, 44 and by two other fastenings 86, 87 to the edge section 45.

The heat exchanger 60 is possibly secured to the plenum 40 in such a way as not to be in contact with the plenum 40, in particular being separated by a clearance at least from a bottom 400 of the plenum 40, and possibly also from the partitions 43, 44. Therefore, a clearance 300, for example in the region of 8 to 10 millimeters, separates the heat exchanger 60 from the bottom 400 of the plenum 40 in order to allow air to flow under the heat exchanger 60 and, more specifically, between the heat exchanger 60 and the plenum 40. The bottom of the plenum may comprise a part of the plenum that is situated below the heat exchanger, when the aircraft is not performing a rollover and/or, for example, when the aircraft is resting on flat ground.

Moreover, the heating system 50 comprises a fluid supply connection 70 for fluidically connecting the heat exchanger 60 and the gas stream 26. For example, the fluid supply connection 70 is in fluidic connection with the gas stream 26 downstream of a compression stage of the compression assembly 20, or even of the compression stage 23 situated before the combustion chamber, in order to draw off hot compressed air.

This fluid supply connection 70 may comprise one or more pipes 71, 72. The term "pipe" denotes one or more pipings for circulating the hot gases that have been drawn off.

The fluid supply connection 70 may comprise a solenoid valve 75 connected by a first pipe 71 to the heat exchanger 60 and by a second pipe 72 to a pressure connector 73 of the turboshaft engine 10. The solenoid valve 75 may be controlled by a human-machine interface 750. The solenoid valve 75 may be a two-position valve for either preventing hot gases from flowing to the heat exchanger 60 or allowing hot gases to flow to the heat exchanger 60.

The fluid supply connection 70 may comprise a pressure sensor 81, downstream of the solenoid valve 75 if any. The pressure sensor 81 is connected to an alerter 82 by a wired or wireless link. The pressure sensor 81 may, for example, transmit an analog, digital, electrical or optical signal to the alerter 82 when the pressure in the fluid supply connection 70 is greater than or equal to a threshold, or conversely when the pressure in the fluid supply connection 70 is less than the threshold. The generated alert may be in the form of a visual alarm, for example emitting a light with a light-emitting diode or an equivalent or one or more characters being displayed on a screen, an audible alarm, via a loudspeaker, and/or a haptic alarm, for example by means of a vibrating unit causing a member held or worn by an individual to vibrate.

The fluid supply connection 70 may comprise at least one narrowing 76 formant a flow limiter. In the example shown, a narrowing 76 is located downstream of the solenoid valve 75. Alternatively, or additionally, a narrowing 76 may be located upstream of the solenoid valve 75, for example on the pipe 72, in order to limit the speed of the air in the solenoid valve 75, or also upstream of the pipe 72.

Moreover, the heating system 50 further comprises a fluid discharge connection 80 for discharging the hot air passing through the heat exchanger 60. For example, the fluid discharge connection 80 leads into the engine compartment 9.

Figure 4:
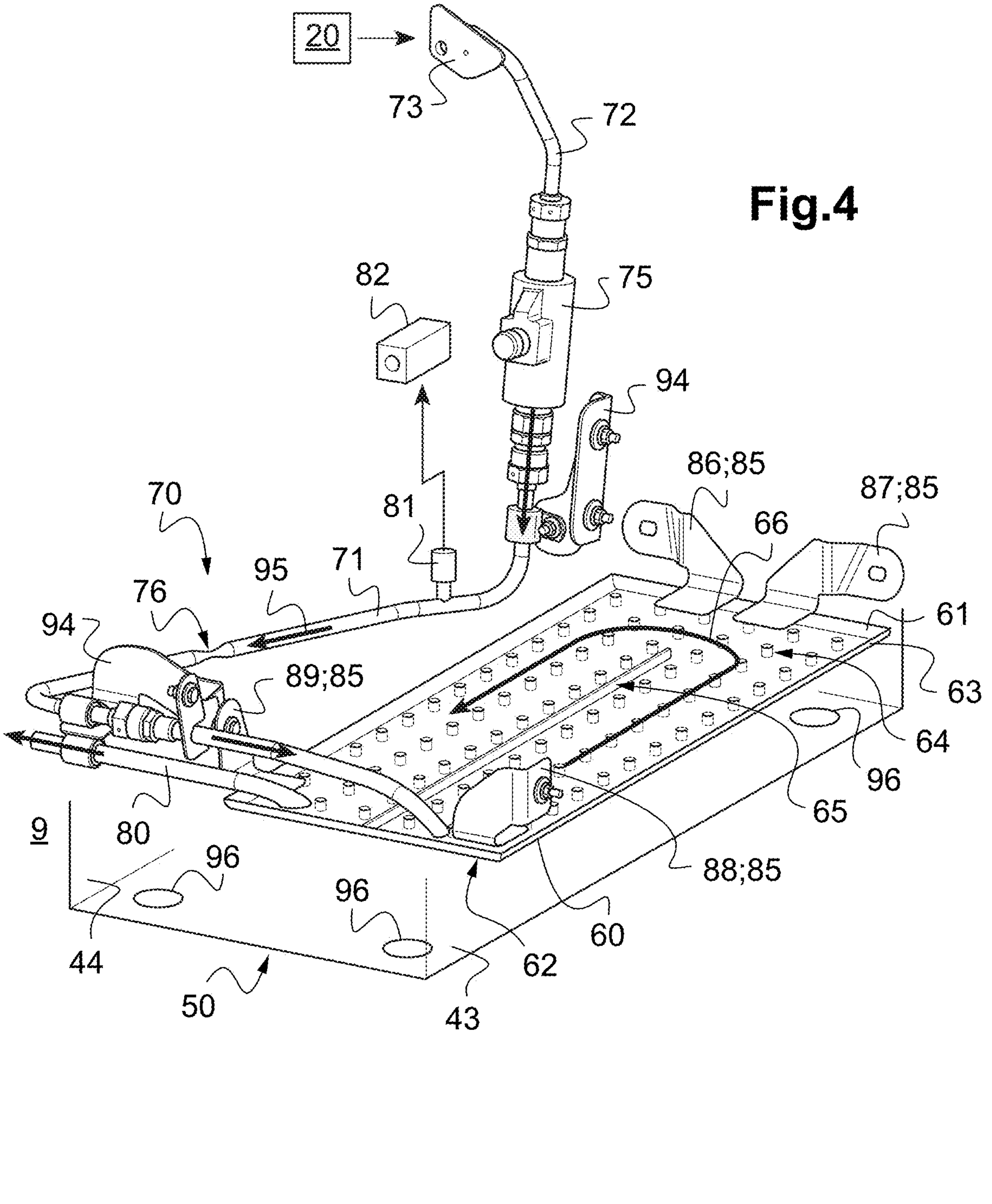
FIG. 4 is a three-dimensional view of a heating system of the disclosure.

In reference to FIG. 4, the fluid supply connection 70 and the fluid discharge connection 80 may pass through the same wall 44 of the plenum 40 to reach the engine compartment 9.

According to another aspect, the heating system 50 may comprise at least one support 94 connecting the fluid supply connection 70 or the fluid discharge connection 80 either to the plenum 40 or to a load-bearing structure, that is not shown, of the aircraft 1.

To this end, the heat exchanger 60 may comprise an internal space delimited by two walls 61, 62 separated by studs 64, and a peripheral edge 63 connecting the two walls 61, 62. These two walls 61, 62 may comprise a top wall 61 and a bottom wall 62 situated under the top wall 61, at least when the aircraft 1 is resting via a landing gear on substantially horizontal ground. The top wall 61 and the bottom wall 62 may be parallel to each other and/or substantially parallelepiped in shape, or indeed identical. The fluid supply connection 70 and the fluid discharge connection 80 are each connected to one of the two walls 61, 62 in order to make the hot air flow through the internal space. For example, the fluid supply connection 70 and the fluid discharge connection 80 may be connected to the same wall, and more specifically to the top wall 61, in the example shown in FIG. 4.

According to another aspect, the heat exchanger 60 may comprise a central deflector 65, for example comprising a partition, that may be straight, arranged between the two walls 61, 62. The central deflector 65 forms a U-shaped path 66 for the hot air between the two walls 61, 62. This path 66 extends from the fluid supply connection 70 to the fluid discharge connection 80. Therefore, the fluid supply connection 70 and the fluid discharge connection 80 may be arranged on the same side of the heat exchanger 60, according to a lengthwise direction wherein this heat exchanger 60 extends.

According to another aspect, the plenum 40 may comprise at least one drain 96. For example, at least one drain 96 is provided on a wall opposite the heat exchanger 60, or indeed situated under the heat exchanger 60. For example, the plenum comprises four drains 96 situated at four corners of the plenum.

Therefore, when the aircraft 1 is flying in icing conditions, if necessary, a pilot maneuvers the human-machine interface to open the solenoid valve 75. The hot air circulating in the compression assembly 20 of the turboshaft engine 10 automatically flows into the fluid supply connection 70. If applicable, the pressure sensor 81 detects a change in pressure and transmits a signal to the alerter 82, that issues an alert.

The hot air then flows into the heat exchanger 60, and is then discharged into the engine compartment 9 by the fluid discharge connection 80. The walls 61, 62 of the heat exchanger 60 heat up and tend to heat up the plenum 40. Any ice, snow or water present in the bottom of the plenum 40 flows through a drain 96 out of the plenum 40.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure.

What is claimed is:

1. An aircraft provided with a turboshaft engine comprising a gas generator, the gas generator comprising a compression assembly supplying compressed air to a combustion chamber, the gas generator comprising a turbine assembly supplied with gas by the combustion chamber, the aircraft having an air supply system with a radial intake provided with a plenum supplying air to the compression assembly, the plenum comprising a duct provided with an outer opening leading to an outside environment situated outside the aircraft, wherein the aircraft comprises a heating system, the heating system comprising a heat exchanger arranged in a volume delimited by the plenum, the heating system comprising a fluid supply connection and a fluid discharge connection connected to the heat exchanger, the fluid supply connection conveying hot air from the turboshaft engine into the heat exchanger.

2. The aircraft according to claim 1, wherein the turboshaft engine comprises a gas stream extending from the plenum and passes successively through the compression assembly, then the combustion chamber and the turbine assembly, the fluid supply connection being in fluidic connection with the gas stream downstream of a compression stage of the compression assembly.

3. The aircraft according to claim 1,
wherein the fluid supply connection and the fluid discharge connection pass through the same wall of the plenum to reach an engine compartment of the aircraft, the turboshaft engine being at least partially housed in this engine compartment.

4. The aircraft according to claim 1,
wherein the fluid discharge connection leads to an engine compartment of the aircraft, the turboshaft engine being at least partially housed in this engine compartment.

5. The aircraft according to claim 1,
wherein the heat exchanger comprises two walls separated by studs, the hot air flowing between the two walls.

6. The aircraft according to claim 5,
wherein the heat exchanger has a central deflector providing a U-shaped path between the two walls, this path leading from the fluid supply connection to the fluid discharge connection in a direction of flow of the hot air.

7. The aircraft according to claim 1,
wherein the heating system comprises one or more fastenings securing the heat exchanger to the plenum, the heat exchanger not being in contact at least with a bottom of the plenum.

8. The aircraft according to claim 1,
wherein the fluid supply connection comprises a solenoid valve arranged between two pipes, the solenoid valve being configured to allow or to prevent the hot air to be conveyed into the heat exchanger.

9. The aircraft according to claim 1,
wherein the fluid supply connection comprises a narrowing forming a flow limiter.

10. The aircraft according to claim 1,
wherein the heating system comprises a pressure sensor connected to an alerter.

11. The aircraft according to claim 1,
wherein the plenum comprises at least one drain.

12. The aircraft according to claim 1,
wherein the air supply system is a passive system ingesting air from the outside environment under the effect of suction from the turboshaft engine.

13. The aircraft according to claim 1,
wherein the heat exchanger is positioned within an airflow path defined inside the plenum such that air flowing through the plenum toward the compression assembly flows around the heat exchanger.

14. The aircraft according to claim 1,
wherein the heat exchanger is spaced from a bottom of the plenum so as to define a clearance between the heat exchanger and the bottom of the plenum.

15. The aircraft according to claim 1,
wherein the fluid supply connection is configured to convey hot air bled from the compression assembly of the turboshaft engine through a bleed air line extending from the compression assembly to the heat exchanger.

16. The aircraft according to claim 1,
wherein air flowing through the plenum toward the compression assembly flows along an exterior surface of the heat exchanger.

17. The aircraft according to claim 1,
wherein the heat exchanger is arranged within the plenum such that the heat exchanger is spaced from surrounding walls of the plenum.

18. The aircraft according to claim 1,
wherein the heat exchanger is arranged within the plenum at a distance from at least one wall of the plenum such that intake air flowing through the plenum is able to circulate around the heat exchanger.

19. An aircraft having a turboshaft engine and an air supply system comprising a plenum configured to supply air to the turboshaft engine, the aircraft comprising a heating system including a heat exchanger arranged within a volume delimited by the plenum, the heating system comprising a fluid supply connection configured to convey hot air from the turboshaft engine to the heat exchanger and a fluid discharge connection connected to the heat exchanger,
wherein the heat exchanger comprises two walls separated by studs, the hot air flowing between the two walls, and
wherein the heat exchanger has a central deflector providing a U-shaped path between the two walls, this path leading from the fluid supply connection to the fluid discharge connection in a direction of flow of the hot air.

20. An aircraft having a turboshaft engine and an air supply system comprising a plenum configured to supply air to the turboshaft engine, the aircraft comprising a heating system including a heat exchanger arranged within a volume delimited by the plenum, the heating system comprising a fluid supply connection configured to convey hot air from the turboshaft engine to the heat exchanger and a fluid discharge connection connected to the heat exchanger,
wherein the fluid supply connection comprises a solenoid valve arranged between two pipes, the solenoid valve being configured to allow or to prevent the hot air to be conveyed into the heat exchanger.

* * * * *